United States Patent [19]
Suntheimer

[11] 3,773,078
[45] Nov. 20, 1973

[54] ROTARY FLOW DISTRIBUTOR
[75] Inventor: George Suntheimer, Hanover, Mass.
[73] Assignee: Robert B. Patterson, Mary D. Patterson and William A. Patterson, Braintree, Mass.
[22] Filed: May 3, 1972
[21] Appl. No.: 249,920

[52] U.S. Cl. .......................................... 137/625.11
[51] Int. Cl. ......................... F16k 5/04, F16k 11/00
[58] Field of Search .............................. 137/625.11

[56] References Cited
UNITED STATES PATENTS
1,228,469   6/1917   Mueller .......................... 137/625.11
2,830,564   4/1958   Bryant ........................... 137/625.11
FOREIGN PATENTS OR APPLICATIONS
864,470   4/1961   Great Britain ................. 137/625.11

Primary Examiner—William R. Cline
Attorney—David M. Driscoll et al.

[57] ABSTRACT

A rotary flow diverter has an input port communicating with a motor driven rotor for directing fluid flow in sequence to a plurality of output ports. The rotor is configured so that there is an overlap in the delivery of the fluid to successive output ports, i.e., fluid is directed to two adjacent output ports as the rotor is positioned between these ports to thereby provide continuous flow through the rotor and uninterrupted flow between adjacent output ports.

8 Claims, 3 Drawing Figures

Patented Nov. 20, 1973

3,773,078

ROTARY FLOW DISTRIBUTOR

BACKGROUND OF THE INVENTION

The present invention relates in general to a fluid flow diverter for sequentially directing fluid from an input port to a plurality of output ports. The device of the present invention is preferably adapted for use in an automated shampooing machine.

There are devices available for sequentially directing fluid from an input port to a plurality of output ports. Generally, these devices are not suitably adaptable for use in an automated shampooing machine wherein the sequential directing of fluid from one output port to its adjacent output port should not be abrupt but should instead be continuous, ie., there should be an overlap wherein some fluid is still being directed to one output port when the next adjacent output port has started to receive some fluid flow. In addition, presently available devices do not provide adequate sealing means for preventing fluid leakage from a device and adequate bearing means for enabling extended operation of the device.

Accordingly, it is a primary object of the present invention to provide an improved flow diverter preferably for use with an automated shampooing machine.

Another object of the present invention is to provide a flow diverter of the rotary type including an input port and a motor driven rotor for sequentially directing the fluid to a plurality of output ports.

A further object of the present invention is to provide a flow diverter in accordance with the preceding object wherein the rotor is configured so that there is some overlap in fluid flow as the rotor rotates from one output port to the next adjacent output port. In this way the comfort provided to the person being shampooed is greatly enhanced.

Still another object of the present invention is to provide a flow diverter that is relatively simple in construction, can be fabricated inexpensively, and provides suitable means for preventing leakage of the fluid from the device.

SUMMARY OF THE INVENTION

To accomplish the foregoing and other objects of the invention, the flow diverter comprises a housing having walls defining a compartment, a rotor disposed within the compartment of the housing, means for suitably supporting the rotor for rotational movement relative to the housing, and drive means coupled to the rotor for causing rotation thereof. The housing is preferably cylindrical in shape, has an input port, and a plurality of equally spaced output ports disposed about the housing and communicating with the compartment of the housing and the input port. The rotor has an input opening which is aligned with the input port of the housing and has an output opening capable of sequentially aligning with the output ports of the housing as the rotor is rotated relative thereto.

In accordance with one aspect of the present invention the output opening of the rotor is constructed sufficiently wide so that there is an overlap in flow to adjacent output ports thereby causing a smooth and continuous transition from output port to output port as the rotor rotates relative to the housing. The flow through the flow diverter is therefore continuous and the flow to the next adjacent port commences before the flow to the previous port terminates.

BRIEF DESCRIPTION OF THE DRAWINGS

Numerous other objects, features and advantages of the invention should now become apparent upon a reading of the following detailed description taken in conjunction with the accompanying drawings in which.

DETAILED DESCRIPTION

Figure 1:
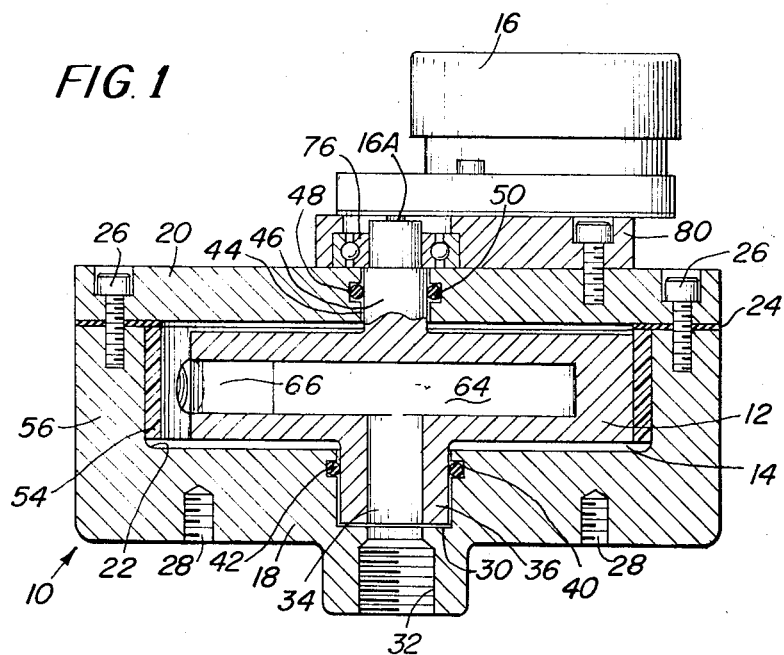
FIG. 1 is a cross-sectional view through one embodiment of a flow diverter constructed in accordance with the principles of the present invention.
Figure 2:
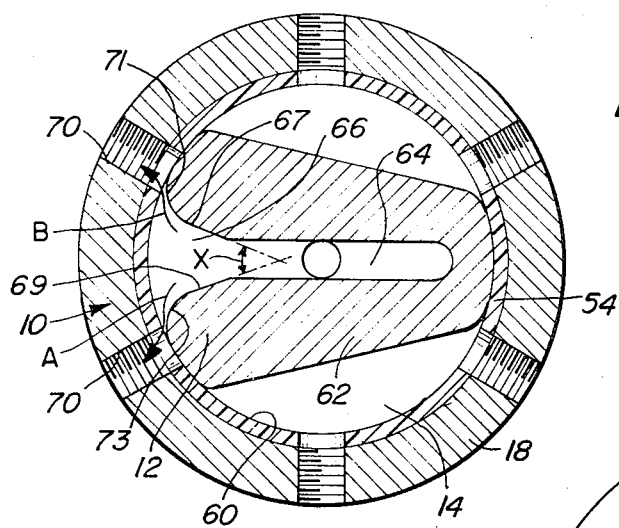
FIG. 2 is a transverse cross-sectional view through the flow diverter of FIG. 1 taken along line 2—2.

Referring now to the drawings and in particluar to FIGS. 1 and 2, there is shown a housing 10, a rotor 12 disposed within a compartment 14 of the housing, and a drive motor 16. The housing and rotor may be constructed of a relatively light metal such as aluminum and the drive motor 16 may be of conventional design. One motor that has been employed in practicing this invention is a Malloy M–002 24 VAC motor which may be powered from a conventional 110 VAC outlet, via an appropriate transformer.

Figure 3:
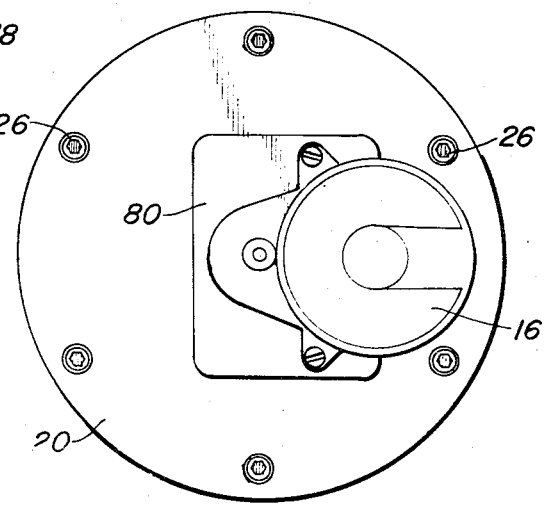
FIG. 3 is a top view of the flow diverter of the present invention.

The housing 10 comprises a base member 18 and a cover plate 20 which defines, with the cylindrical recess 22 in base member 18, the compartment 14. A gasket 24 is disposed between the base member 18 and the cover plate 20, and, in the embodiment shown, six screws 26 are used to secure the base member and cover plate together after the rotor has been positioned within the compartment 14. The cover plate 20 is provided with a stepped recess for accommodating each screw and the base member is provided with a threaded hole for enabling the securing of the base member and cover plate by means of the screws 26. FIG. 3 shows the arrangement for the screws 26 in the cover plate 20.

Means may also be provided on the base member for securing the entire device of the present invention to another member. In FIG. 1 this means is shown as at least two tapped holes 28. In addition to the recess 22 defined in base member 18, there is also defined a smaller cylindrical recess 30, and an input port 32 which communicates with an input opening 34 of rotor 12. The input opening 34 of the rotor is defined in a downwardly depending post 36 which is relatively tightly fitted within recess 30 of member 18. A relatively small channel 40 is defined within member 18 facing into recess 30 for accommodating an annular sealing "O" ring 42. This "O" ring prevents the leakage of fluid introduced through the input port 32 from passing upwardly between post 36 and the portion of base member 18 that defines recess 30. Recess 30 also provides a lower bearing support for the rotor 12.

The cover plate 20 has a centrally disposed passageway 44 that extends into compartment 14 and contains an upwardly extending post 46 of the rotor when the rotor is disposed within the housing. A channel 48 is also provided in cover plate 20 for accommodating a sealing "O" ring 50 which may be of the same type as "O" ring 42.

A rotary seal 54 which is annular in shape is disposed within compartment 14 adjacent wall 56 of member 18 and provides a seal between wall 56 and rotor 12. To assure that there is not excessive friction there may also be provided an annular plastic shim 60 between the seal 54 and the rotor 12. Seal 54 and shim 60 both have six openings equally spaced thereabout for aligning with the output ports of the housing.

The rotor 12 includes a cylindrical center portion 62 having the input opening 34 extending thereinto and defines an elongated passage 64 having an output end 66 of enlarged size as depicted in particlar in FIG. 2. The elongated passage 64 may have a square cross-section and the output end 66 a rectangular cross-section of gradually increasing size. In FIG. 2 the rotor 12 is shown directed intermediate two of the output ports 70 disposed in wall 56 of base member 18 of the housing. In the embodiment shown there are six ports 70 equally spaced about the base member 18. In the position of the rotor shown in FIG. 2 it is noted that fluid communication can take place by way of arrows A and B, through adjacent output ports 70.

It is preferred that the angle X shown in FIG. 2 between the opposite facing surfaces 67 and 69 defining the output opening be on the order of 30°. It is also preferred, in order to provide smooth continuous flow from one output port to its adjacent output port, that the surfaces 67 and 69 be curved at 71 and 73.

The top extending post 46 of rotor 12 extends above the top surface of cover plate 20 and a bearing support 76 is provided for rotatably supporting the top end of the rotor. The motor 16 is affixed by suitable means such as screws to a motor mounting plate 80 which is secured to the top surface of plate 20. The output shaft 16A of the motor 16 couples to post 46 for facilitating movement of the rotor 12. A typical set screw arrangement may be used for coupling the output of the motor 16 to the rotor 12.

Having described one preferred embodiment of the apparatus of the present invention, it should now become apparent that various modifications and departures from the disclosed embodiment can be made, all of which are intended to fall within the spirit and scope of the present invention. For example, the rotor is shown as being a one-piece unit. In an alternate embodiment it is possible that the rotor can be constructed of separate plates suitably interconnected. Also, one means for securing the device to another member is shown but obviously other attachment means may be used. The present invention should only be limited by the following appended claims.

What is claimed is:

1. A flow diverter comprising;
   a generally cylindrically-shaped housing having an annular wall integrally formed with a base wall, said annular and base walls defining a compartment,
   said housing having an input port coupled through said base wall and a plurality of output ports coupled through and spacedly disposed about said annular wall and communicating with said compartment,
   a rotor disposed within said compartment having an input opening in line with the input port of the housing and an output opening capable of sequentially aligning with the output ports of said housing,
   a circular cover and means for securing the cover to the annular wall, said cover in part defining the compartment,
   means associated with both said cover and base wall for supporting opposite sides of said rotor for rotational movement relative to said housing,
   and a drive means and means for securing said drive means to said cover, said drive means coupling to said rotor for causing rotation thereof,
   the output opening of said rotor having a rectangular cross-sectional shape that gradually increases in area towards said output ports, said output opening being defined in part by like opposing surfaces that include a straight section closest to said input opening and an arcuate section closest to said annular wall, said output opening having an enlarged area as defined by said arcuate section to permit communication from said output opening to adjacent output ports in preselected positions of said rotor.

2. The flow diverter of claim 1 wherein said rotor has posts extending from opposite sides thereof, said cover including an aperture for receiving one of said posts with said post extending thereabove.

3. The flow diverter of claim 2 wherein said one post in conjunction with a bearing means forms a support for one side of said rotor, said upwardly extending portion of said one post providing means for driving said rotor by means of said drive means.

4. The flow diverter of claim 2 including an annular seal disposed intermediate said annular wall and rotor.

5. The flow diverter of claim 4 wherein the base wall has a cavity for receiving the other of said posts, said input opening being provided in said other post.

6. The flow diverter of claim 1 wherein said rotor has an elongated passage forming at one end said output opening and at the other end a mixing chamber and a shorter passage defining said input opening at one end and connecting at the other end to said elongated passage at a point between the ends of said elongated passage.

7. The flow diverter of claim 1 wherein said straight surfaces are at an angle to each other of about 30°.

8. A flow diverter comprising;
   a generally cylindrically-shaped housing having an annular wall integrally formed with a base wall, said annular and base walls defining a compartment,
   said housing having an input port coupled through said base wall and a plurality of output ports coupled through and spacedly disposed about said annular wall and communicating with said compartment,
   a rotor disposed within said compartment having an input opening in line with the input port of the housing and an output opening having an enlarged area to permit communication from said output opening to adjacent output ports and capable of sequentially aligining with the output ports of said housing,
   a circular cover and means for securing the cover to the annular wall, said cover in part defining the compartment,
   means associated with both said cover and base wall for supporting opposite sides of said rotor for rotational movement relative to said housing,
   and a drive means and means for securing said drive means to said cover, said drive means coupling to said rotor for causing rotation thereof,
   said rotor further having an elongated passage forming at one end said output opening and at the other end a terminating mixing chamber, and a shorter passage defining said input opening at one end and communicating at the other end with said elongated passage at a point intermediate the ends of said elongated passage.

* * * * *